United States Patent [19]

Wiedmann

[11] Patent Number: 4,786,514
[45] Date of Patent: Nov. 22, 1988

[54] METHOD AND APPARATUS FOR EXTRUDING A FOOD PRODUCT

[75] Inventor: Werner Wiedmann, Stuttgart, Fed. Rep. of Germany

[73] Assignee: Werner & Pfleiderer GmbH, Fed. Rep. of Germany

[21] Appl. No.: 92,157

[22] Filed: Sep. 2, 1987

[30] Foreign Application Priority Data

Oct. 30, 1986 [DE] Fed. Rep. of Germany ....... 3636867

[51] Int. Cl.$^4$ .................. G01N 33/02; B28B 17/00
[52] U.S. Cl. .................................. 426/231; 425/144; 425/145; 426/448; 426/449
[58] Field of Search ............... 426/231, 448, 449, 523; 425/135, 144, 145, 149

[56] References Cited

U.S. PATENT DOCUMENTS

| | | | |
|---|---|---|---|
| 3,148,231 | 9/1964 | Spencer | 425/135 |
| 3,711,296 | 1/1973 | LaWarre | 426/523 |
| 3,728,056 | 4/1973 | Theysohn | 425/135 |
| 4,197,070 | 4/1980 | Koschmann | 425/135 |
| 4,590,081 | 5/1986 | Sawada et al. | 426/448 |
| 4,667,852 | 5/1987 | Siemann | 425/135 |

FOREIGN PATENT DOCUMENTS 3341090 5/1985 Fed. Rep. of Germany .

Primary Examiner—George Yeung
Attorney, Agent, or Firm—Laff, Whitesel, Conte & Saret

[57] ABSTRACT

In a method of extruding a food product wherein starting products and water are fed to an extruder and mixed in a mixing zone and wherein the mixture is heated and plastified by the supply of shearing energy and, after passing through a nozzle, is foamed, in order to achieve a product quality which remains constant independently of alterations in the properties of the starting products and external disturbing factors, it is provided that, with a constant speed of rotation of the shaft or shafts of the extruder, the drive power (N) applied to the shaft or shafts by the drive motor is measured, that the bulk throughput (m) of the starting products supplied is measured, that the quotient (s) of these quantities (N,m) is formed in a computing device and that this specific energy (s) thus determined is fed, as a controlled quantity, to a controller which keeps it constant in accordance with a preset desired value ($s_{Soll}$) in such a manner that the supply of water to the mixing zone of the extruder and/or a supply of steam are influenced as correcting variables by the controller.

13 Claims, 1 Drawing Sheet

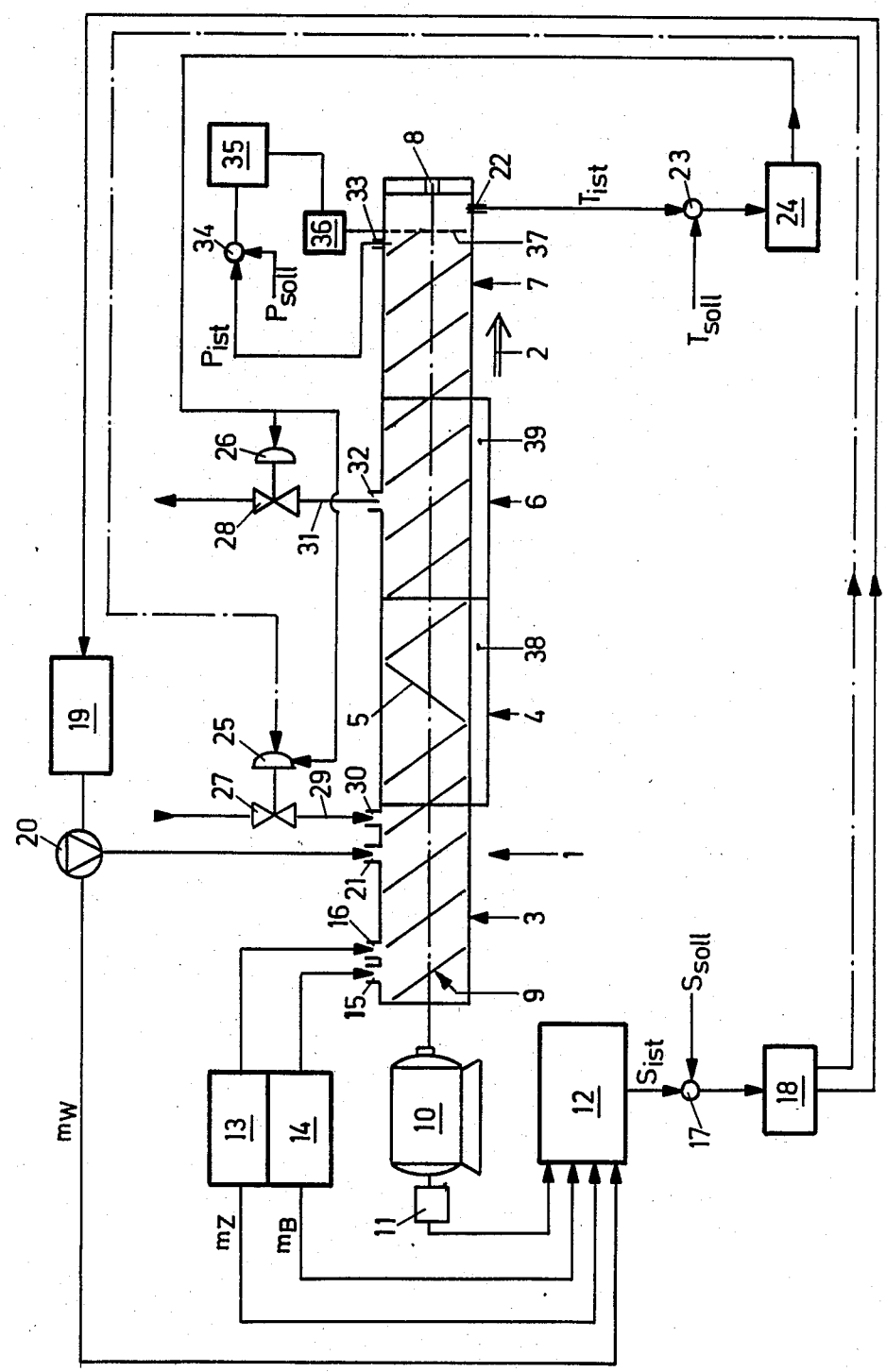

METHOD AND APPARATUS FOR EXTRUDING A FOOD PRODUCT

FIELD OF THE INVENTION

The invention is directed towards a method for extruding a food product wherein starting products and water are fed to an extruder and mixed in a mixing zone and wherein the mixture is heated and plastified by the supply of shearing energy and is foamed after passing through a nozzle and an apparatus for carrying out the method for extruding a food product comprising an extruder, feed devices for feeding starting products and water into a mixing zone of the extruder, an electric drive motor for the shaft or shafts of the extruder.

BACKGROUND OF THE INVENTION

In such methods and apparatuses, biopolymers, such as starches or proteins for example, are pressure-cooked in a few seconds, substantially by the action of shearing forces and expanded to a foamy structure. The term "cooking extrusion" is therefore also used.

Such a method for the extrusion of foodstuffs consisting of starch carriers and proteins is known from DE-OS No. 33 41 090 wherein a proportioned addition of water is effected by means of flow control devices at the beginning of the conveying path of the extrusion apparatus. In this case, however, the metered addition of water is effected exclusively from the point of view of adjusting a specific water content.

It is known from U.S. Pat. No. 3,711,296 to increase the natural water content of the raw material by an appropriate addition of water. By varying the speed of rotation of the screw of the extruder, an attempt is made to adjust pressure and temperature conditions under which a plastifying necessary for the extrusion takes place. In addition, it is known, per se, from this printed document to provide a steaming-out zone in the second half of the extruder or alternatively to this, an offtake along the extruder. This offtake is effected with the object of removing the water vapour given off during the plastifying, as completely as possible.

A basic problem with such cooking extrusion operations lies in the fact that, apart from the great fluctuations in the water content of the biological raw materials, these also occur in the fat and cellulose contents, as a result of which the quality of the product, for example hardness, density, water solubility and viscosity, colour and taste, is altered, while fluctuation in the proportioning of the individual components, during starting phenomena and in the temperature of the raw materials cause the same negative effect.

SUMMARY OF THE INVENTION

Starting from this, it is the object of the invention to indicate a method and an apparatus whereby as many of such varying influences as possible can be compensated while achieving a product having a constant quality, independently of this.

The invention is based on recognition of the fact that because of the physical and chemical modification of the biopolymer by shearing and heat transfer during the cooking extrusion operation, all end quality parameters depend very decisively on the mass-specific mechanical supply of energy, on the retention time in the extruder and on the temperature profile of the product along the extruder. Accordingly, the constant retention time distribution which has to be demanded means that the speed of rotation of the screw and the mass flow of the biopolymer are kept constant as are also the pressure conditions before the extrusion nozzle as far as possible.

The specific mechanical supply of energy is defined as the quotient of net drive power and total mass flow. A control of the specific energy introduced via the speed of rotation is known from the rubber and plastics field, in order to obtain a constant dispersion quality in this manner. In addition, influencing the temperature by giving a certain temperature to the housing plays a part there. Because of the constant retention time required during cooking extrusion—as explained—it is not possible to keep the specific introduction of energy constant there via the speed of rotation. Moreover, the retention times at high temperature are so short during cooking extrusion that giving a certain temperature to the housing can only have a subordinate influence.

The problem according to the invention is solved by a method according to which the drive power applied by the drive motor to the shaft or shafts is measured at a constant speed of rotation of the shaft or shafts of the extruder, the bulk throughput of the starting products fed in is measured, the quotient of these quantities is formed in a computing device and this specific energy thus determined is fed as the controlled condition to a controller which keeps this constant in accordance with a preset desired value in such a manner that the supply of water to the mixing zone of the extruder and/or a supply of steam is influenced as a correcting variable by the controller. The essence of this method lies in that the specific introduction of energy is measured during a cooking extrusion operation and is kept constant as a result of the fact that the metered addition of water is varied or that a controlled supply of steam is effected.

As a result of this, fluctuations in humidity in the product are completely compensated and fluctuations in the fat, sugar or cellulose content in the product and in the proportioning are correctly compensated in their trend. Thus ultimately what is decisive according to the invention is the idea of keeping the specific supply of energy constant via the humidity of the product in the extruder. The control can be effected between water contents of 0 and 50%. This can be done most simply by an adjustment of the supply of water, and with this type of control, the temperature of the product in the extruder is not substantially influenced. Such an influence on the temperature accompanies the supply of steam or the offtake of steam which is likewise possible.

A particularly constant quality of the product is achieved by the superimposed control of temperature which can compensate for the great majority of all the fluctuations which occur.

Offtake and supply of steam may advantageously be effected from the region after the plastifying zone and before that plastifying zone, respectively.

As a result of this superimposed control with the supply of steam and the offtake of steam at appropriate places in the extruder, assurance is provided that the temperature profile of the product remains constant, particularly at the point of the highest temperature, that is to say generally before the nozzle. The last three seconds in the cooking zone determine decisively whether thermal alterations and damage to the extrudate occur. The control provided is perferably effected between 50 mbar and 20 bar.

The moisture of the product in the extruder is altered through the control interventions provided with regard to energy and temperature and hence the nozzle pressure loss is altered via the viscosity. In many cases, this may lead to an inadmissible alteration in the pressure backflow and the retention time distribution for which reason a control via a mechanical product restrictor may be provided in order to keep these parameters constant.

Simply in order to reinforce the control operations according to the invention and to achieve a desired temperature profile along the extruder, the housing wall may be given a controlled temperature in sections.

An apparatus for carrying out the method comprises a device for measuring the power consumption of the drive motor, devices for determining the throughput of the starting products, devices for the variable proportioning of the added water and/or steam, a computing device which is connected to the devices for determining the throughput of the starting products supplied and the device for detecting the power consumption and which is connected to a controller, the output of the controller being connected to the adjustment of the device for the supply of water and/or the supply of steam which can be proportioned, i.e., a closed loop control with a controlled supply of water, and further a control with controllable steam offtake or controllable supply of steam and a controll of the nozzle pressure. The particular subordinate claims give advantageous developments.

The three closed loop controls referred to may advantageously be superimposed one on the other and be coordinated via a common computer device. In this case, the control via the supply of water has the greatest importance because of the mechanical and exponential-thermal influence on the product. In itself, the control via supply of steam and offtake of steam is less influential because of the purely exponential-thermal influence. Least influential and therefore dispensable for many practical applications is the control via a variable restriction in front of the nozzle because this is only subject to a linear thermal influence.

Further features, advantages and details of the invention can be seen from the following description of a preferred form of embodiment of the invention with reference to the drawing.

BRIEF DESCRIPTION OF THE DRAWING

This shows a diagrammatic illustration, like a circuit diagram, of a cooking extrusion apparatus with the measuring circuits and closed loop controls provided according to the invention.

DESCRIPTION OF A PREFERRED EMBODIMENT

In the drawing, an extruder 1 is illustrated which comprises in succession in the conveying direction (arrow 2), a mixing zone 3, a plastifying zone 4 with return elements 5, a cooking zone 6 and an extrusion zone 7 which is followed by an extrusion nozzle 8.

The screws 9 of the twin-shaft screw extruder 1 are driven by a motor 10. The power consumption N of the motor 10 is detected by a power measuring device 11 and passed on to a central computing device 12. Disposed at the beginning of the extruder 1 are product proprotioning devices 13, 14 which feed starting products such as sugar with a throughput $m_Z$ and biopolymer with a throughput $m_B$ to the extruder through inlets 15, 16. Furthermore, water is supplied to the extruder with a throughput $m_W$.

The quantities $m_Z$, $m_B$ and $m_W$ are conveyed to the central computing device 12 which determines, from these, in conjunction with the particular drive power, the particular specific energy introduced in relation to the throughput of product in accordance with $$s = \frac{N}{m_Z + m_B + m_W}$$

(The quantities $m_B$, $m_Z$ and $m_W$ have the dimension mass per time).

The central computing device 12 puts out the actual value, thus determined, of the specific energy s which is compared, at a comparison point 17, with the desired value which is likewise preset there. The difference serves as a controlled condition for the input of a controller 18. The output of the controller 18 is connected to an adjusting device 19 for the speed of rotation of a water proportioning pump 20 which measures out water into the extruder 1 through an inlet 21. By this means, a first closed loop control is formed which keeps the specific energy introduced into the material being mixed in the extruder 1 in accordance with the preset desired value $s_{Soll}$ in that the amount of water added in measured amount and hence the viscosity of the extruder filling is altered.

A second closed loop control is formed by a temperature sensor device 22 which is disposed in the region in front of the throttle valve 37 and which supplies the measured actual value of the temperature $T_{Ist}$ to a comparison point 23 at which this value is compared with a preset desired temperature value $T_{Soll}$, the difference being applied to the input of a controller 24. Through the output of the controller 24, adjusting devices 25 and 26 for steam throttle valves 27 and 28 respectively are adjusted, through which, via an inlet pipeline 29 and an inlet 30, either superheated steam is injected before the plastifying zone 4 or, via a pipeline 31 and an outlet 32, steam can be drawn off after the plastifying zone in order to keep the temperature of the product being processed constant in this manner.

A third closed loop control is formed by a pressure sensor 33 in the region in front of the throttle valve 37 which determines an actual pressure value $P_{Ist}$ which is compared, at a comparison point 34, with a desired pressure value $P_{Soll}$. The difference serves as a controlled condition for the input of a controller 35, the output of which serves with an adjusting device 36 for a throttle valve 37 which is disposed in front of the nozzle 8, is angularly adjustable and is indicated only diagrammatically in broken lines. The pressure conditions can be altered according to the alteration in the angular position of the throttle valve 37.

The controllers 18, 24 and 35 or the comparison points 17, 23, 34 are connected to the central computing device 12—as not illustrated in detail—and are controlled in a coordinated manner by this.

The compensation for disturbances via the three closed loops controls under consideration is described below.

Devices 38 and 39 for giving a certain temperature to the housing, which are shown diagrammatically, may additionally be provided in the region of the plastifying zone 4 and cooking zone 6. Through these, a desired temperature profile, controlled by controllers not illustrated in detail, can be preset.

The apparatus described above can be used, using the method according to the invention, for the production of very different food products. By way of example, breakfast cereals, snacks, cornflakes from pellets, flat bread, cornflour, physically and chemically modified starches, degerming of spices, oilseeds, cereals, texturized plant proteins, strips of liquorice and winegums, pet foods, reaction of casein to caseinate and alkalization of cocoa may be mentioned in this connection.

The production of a granulated maize snack is considered below as a special example of application.

For this purpose a twin-shaft extruder ZSK70, rotating in the same direction, with a screw diameter of 70 mm and speed of 200 r.p.m. is used. The throughput of maize meal is 200 kg/h and the addition of water 12 kg/h. The power consumption of the extruder is 8.5 KW. The housing is given a temperature controlled at 140° C. The specific introduction of energy is fixed at 480 KJ/kg. The pressure in front of the mechanical product restricting device is 73 bar; the temperature in front of the nozzle is 170° C.

Starting from these basic conditions, the use of the apparatus according to the invention and the method according to the invention is illustrated below with the occurrence of disturbances of various kinds.

1st Example:
After 8000 hours of operating time, wear of the screws reduces the external screw diameter by 2 mm. As a result of this, the specific supply of energy rises to 50 KJ/kg, the pressure to 93 bar and the product temperature to 170° C. According to the invention, this can be compensated in that the correcting variable "supply of water" is increased by 2.5 liters per hour and the correcting variable "restriction position" of the mechanical product restrictor is reduced from an opening angle of 30° to 15°.

2nd Example:
A flueutation in raw material occurs in the form of an increase in the moisture of the starting product by 2.5% corresponding to 5 liters per hour. In this case, the introduction of energy drops to 418 KJ/kg, the pressure to 55 bar and the temperature to 161° C. For the compensation, the correcting variable "supply of water" is reduced by 5 liters per hour.

3rd Example:
An increase in the fat content of the raw material by 2% occurs. As a result of this, the introduction of energy drops to 465 KJ/kg, the pressure rises to 77 bar and the temperature drops to 168° C. According to the invention, compensation is effected in that the correcting variable "steam offtake" is increased, for example from 20% of the free passage to 36% and by opening the mechanical product restrictor from an opening angle of 30° to 53°. Here the energy control comes into force only temporarily in order to accelerate the compensation. After that the supply of water returns to its old value.

4th Example:
The three quantities mentioned above occur superimposed one on the other. According to the invention, a correction is carried out by means of a superimposed control, three correcting variables being altered simultaneously, in that the supply of water is reduced by 2.5 liters per hour, the offtake of steam is increased from 20% of the free passage to 36% and the restrictor setting is enlarged from 30° to 38°.

What is claimed is:

1. A method of extruding a food product comprising the steps of continuously introducing starch-containing food ingredients into an extruder, mixing and heating the ingredients in a mixing zone of the extruder by supplying shearing energy, adding a predetermined quantity of water to the ingredients in said mixing zone, further comprising measuring drive power (N) applied by an extruder drive motor to a shaft or shafts of said extruder at a constant speed of rotation, measuring bulk throughput (m) of the introduced ingredients, forming quotient (s) of the drive power (N) and the bulk throughput (m) in a computing device to determine specific energy (s) being consumed, feeding the specific energy (s) as the controlled condition to a controller to keep the specific energy constant in accordance with a preset desired value ($s_{Soll}$) by adjusting the supply of water to the mixing zone of the extruder as a correcting variable by the controller.

2. A method as claimed in claim 1 wherein the adjustment of the supply of water is effected by varying the speed of rotation of a feed pump.

3. A method as claimed in claim 1 comprising controlling the product temperature by adjusting the steam offtake or steam addition which is superimposed on a control to keep the specific energy supply constant through adjustment of water supply.

4. A method as claimed in claim 3, wherein controlling the offtake of steam is effected from a region after a plasticizing zone of the extruder and controlling the addition of steam is effected in a region before the plasticizing zone.

5. A method as claimed in one of the claims 1 to 4 comprising measuring pressure in front of a mechanical product restricting device mounted in front of one of the extrusion nozzles of the extruder and keeping the pressure constant by adjusting this product restricting device.

6. A method as claimed in one of the claims 1 to 4 comprising maintaining a predetermined temperature through
the housing of the extruder.

7. An apparatus for extruding a food product comprising an extruder, feed devices for feeding starting products and water into a mixing zone of the extruder, an electric drive motor for a shaft or shafts of the extruder, comprising a device for measuring power consumption of the drive motor, said devices including means for determining the throughput of the starting products, means for variable proportioning of water or steam or both water and steam supply to said extruder, a computing means which is connected to the means for determining the throughput of the starting products supplied and the means for detecting the power consumption and which is connected to a controller, an output of the controller being connected to an adjusting device for the supply of water or the supply of steam to said extruder.

8. An apparatus as claimed in claim 7, comprising a proportioning pump for the adjustable supply of water to said extruder.

9. An apparatus as claimed in claim 7 comprising a measuring device in a region before a nozzle of the extruder to detect temperature of the product and a steam offtake pipeline with a steam throttle valve in a region after a plasticizing zone of the extruder, the temperature measuring device being connected to an input of a controller and an output of the controller being connected to the steam throttle valve.

10. An apparatus as claimed in claim 9, wherein disposed in a region before the plasticizing zone is a steam injection pipeline with a steam throttle valve which is connected to the output of the controller following the temperature measuring device.

11. An apparatus as claimed in claim 7, wherein a pressure measuring device is disposed before a mechanical product restricting device mounted in front of a nozzle of the extruder, the pressure measuring device being connected to an input of a second controller and an output of the second controller being connected to a servo motor of a mechanical product restricting device.

12. An apparatus as claimed in claim 11, wherein the second controller is connected to a computing device.

13. A method of extruding a food product comprising the steps of continuously introducing starch-containing food ingredients into an extruder, mixing and heating the ingredients in a mixing zone of said extruder by supplying shearing energy, adding a predetermined quantity of water to the ingredients in said mixing zone, supplying steam to the extruder, further comprising measuring drive power (N) applied by an extruder drive motor to a shaft or shafts of the extruder at a constant speed of rotation, measuring bulk throughput (m) of the introduced ingredients, forming the quotient (s) of the drive power (N) and the bulk throughout (m) in a computing device to determine the specific energy (s) being consumed, feeding the specific energy (s) as the controlled condition to a controller to keep the specific energy constant in accordance with a preset desired value ($s_{Soll}$) in such a manner that the supply of steam is adjusted as a correcting variable by the controller.

* * * * *